United States Patent
Tao et al.

(10) Patent No.: US 12,487,679 B2
(45) Date of Patent: Dec. 2, 2025

(54) TACTILE-FEEDBACK MODULE AND ELECTRONIC DEVICE

(71) Applicants: BEIJING BOE TECHNOLOGY DEVELOPMENT CO., LTD., Beijing (CN); BOE Technology Group Co., Ltd., Beijing (CN)

(72) Inventors: Yongchun Tao, Beijing (CN); Dexing Qi, Beijing (CN); Yingzi Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/649,092

(22) Filed: Apr. 29, 2024

(65) Prior Publication Data
US 2024/0319795 A1    Sep. 26, 2024

Related U.S. Application Data

(63) Continuation of application No. PCT/CN2023/083579, filed on Mar. 24, 2023.

(51) Int. Cl.
*G06F 3/01* (2006.01)
*G06F 1/16* (2006.01)

(52) U.S. Cl.
CPC ............ *G06F 3/016* (2013.01); *G06F 1/1643* (2013.01); *G06F 1/1681* (2013.01)

(58) Field of Classification Search
CPC ....... G06F 3/016; G06F 1/1643; G06F 1/1681
See application file for complete search history.

(56) References Cited

U.S. PATENT DOCUMENTS

| | | | | | |
|---|---|---|---|---|---|
| 5,808,707 | A | * | 9/1998 | Niibori | G02F 1/133308 349/150 |
| 5,854,625 | A | * | 12/1998 | Frisch | G06F 3/04142 345/173 |
| 6,118,435 | A | * | 9/2000 | Fujita | G06F 3/016 345/173 |
| 6,429,846 | B2 | * | 8/2002 | Rosenberg | G06F 3/011 345/173 |

(Continued)

FOREIGN PATENT DOCUMENTS

| | | |
|---|---|---|
| CN | 107132910 A | 9/2017 |
| CN | 109005268 A | 12/2018 |

(Continued)

*Primary Examiner* — Benyam Ketema
(74) *Attorney, Agent, or Firm* — WHDA, LLP

(57) ABSTRACT

A tactile-feedback module and an electronic device are provided, which relates to the technical field of electronics. The tactile-feedback module includes: a touch substrate having a touch surface; an actuator element disposed at one side of the touch substrate away from the touch surface and configured to generate vibration in a first direction, wherein the first direction intersects with the touch surface; and a lever located between the actuator element and the touch substrate, wherein a power end of the lever is connected to the actuator element, a resistance end of the lever is connected to the touch substrate, in a stationary state of the actuator element, a plane where the lever is located is parallel to the touch surface, and the lever is configured to, under driving of the actuator element, drive the touch substrate to vibrate.

18 Claims, 8 Drawing Sheets

(56) References Cited

U.S. PATENT DOCUMENTS

| | | | | |
|---|---|---|---|---|
| 6,822,635 B2* | 11/2004 | Shahoian | G06F 1/169 | 345/173 |
| 7,336,260 B2* | 2/2008 | Martin | G09B 21/003 | 345/169 |
| 7,499,040 B2* | 3/2009 | Zadesky | G06F 3/0338 | 345/173 |
| 10,152,132 B2* | 12/2018 | Belley | F16F 7/12 | |
| 10,564,724 B1 | 2/2020 | Bergeron et al. | | |
| 11,372,457 B1* | 6/2022 | Lee | G06F 3/03547 | |
| 11,539,278 B2* | 12/2022 | Umehara | H02K 33/02 | |
| 11,592,903 B2* | 2/2023 | Rosenberg | G06F 3/047 | |
| 11,726,584 B1* | 8/2023 | Huang | G06F 1/169 | 345/157 |
| 11,995,239 B2* | 5/2024 | Welke | G06F 3/041 | |
| 12,013,992 B2* | 6/2024 | Liu | G06F 3/016 | |
| 2002/0118319 A1* | 8/2002 | Ootsuta | G06F 3/0238 | 349/59 |
| 2002/0149561 A1* | 10/2002 | Fukumoto | G06F 3/04886 | 345/156 |
| 2002/0149571 A1* | 10/2002 | Roberts | G06F 3/04142 | 345/173 |
| 2004/0164971 A1* | 8/2004 | Hayward | G06F 3/03547 | 345/179 |
| 2006/0146037 A1* | 7/2006 | Prados | G06F 3/03547 | 345/173 |
| 2006/0181517 A1* | 8/2006 | Zadesky | G06F 1/1637 | 345/169 |
| 2008/0018592 A1 | 1/2008 | Park | | |
| 2008/0024457 A1* | 1/2008 | Fliegner | G01C 21/3652 | 345/173 |
| 2008/0122797 A1* | 5/2008 | Soh | G06F 3/0488 | 345/173 |
| 2008/0202824 A1* | 8/2008 | Philipp | G06F 3/0338 | 178/18.01 |
| 2010/0172080 A1* | 7/2010 | Bestle | G06F 3/016 | 345/173 |
| 2010/0182263 A1* | 7/2010 | Aunio | G06F 3/016 | |
| 2010/0259495 A1* | 10/2010 | Shigetaka | G06F 3/03547 | 345/173 |
| 2015/0159813 A1 | 6/2015 | Gielen | | |
| 2015/0185769 A1* | 7/2015 | Takata | G06F 1/169 | 345/173 |
| 2017/0249011 A1* | 8/2017 | Belley | G06F 3/016 | |
| 2018/0088736 A1* | 3/2018 | Jeong | H10K 59/40 | |
| 2024/0319795 A1* | 9/2024 | Tao | G06F 1/1643 | |

FOREIGN PATENT DOCUMENTS

| | | |
|---|---|---|
| CN | 214474934 U | 10/2021 |
| CN | 114442850 A | 5/2022 |
| JP | 2013016336 A * | 1/2013 |

* cited by examiner

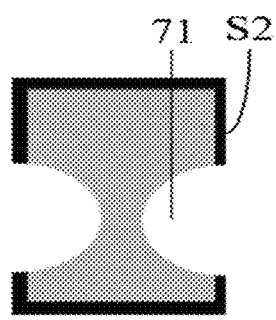 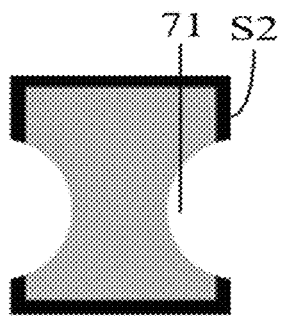 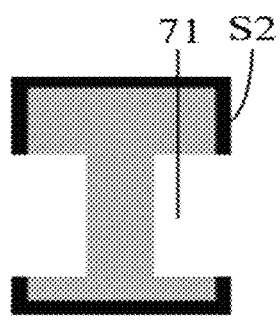 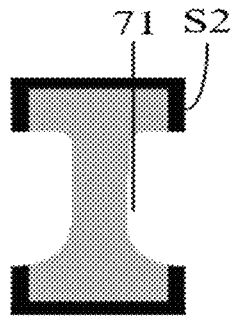
FIG. 7A　　　FIG. 7B　　　FIG. 7C　　　FIG. 7D
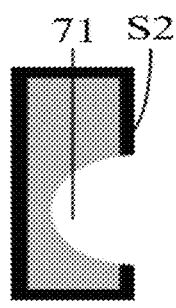 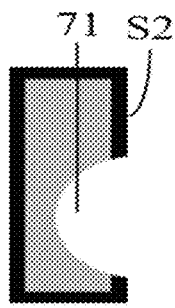 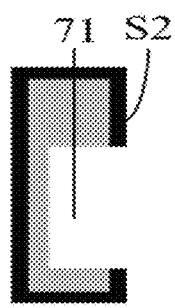 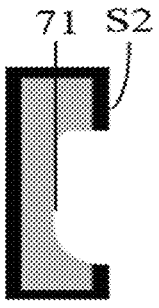
FIG. 7E　　　FIG. 7F　　　FIG. 7G　　　FIG. 7H

TACTILE-FEEDBACK MODULE AND ELECTRONIC DEVICE

TECHNICAL FIELD

The present disclosure relates to the technical field of electronics and, more particularly, to a tactile-feedback module and an electronic device.

BACKGROUND

Tactile feedback is one of the keys of the current technological development, the concept of the tactile feedback is to cause the device terminal to interact with the human body through the tactile sensation. Tactile feedback may be classified into two types, vibration feedback and haptic reproduction technology. The surface haptic reproduction technology can sense the object features by touching the screen with a naked finger, to realize a high-efficiency natural interaction at the multimedia terminal. The surface haptic reproduction technology has a tremendous value in study, and thus has been paid extensive attention by researchers worldwide.

SUMMARY

A tactile-feedback module is provided by the present disclosure, wherein the tactile-feedback module includes:
  a touch substrate having a touch surface;
  an actuator element disposed at one side of the touch substrate away from the touch surface and configured to generate vibration in a first direction, wherein the first direction intersects with the touch surface; and
  a lever located between the actuator element and the touch substrate, wherein a power end of the lever is connected to the actuator element, a resistance end of the lever is connected to the touch substrate, in a stationary state of the actuator element, a plane where the lever is located is parallel to the touch surface, and the lever is configured to, under driving of the actuator element, drive the touch substrate to vibrate.

In some embodiments, the tactile-feedback module further includes:
  a supporting base located at one side of the actuator element away from the touch substrate;
  an anchoring-point portion located between the supporting base and the lever, and fixed on the supporting base;
  wherein a fulcrum of the lever is disposed at one side of the anchoring-point portion away from the supporting base, the actuator element is fixed on the supporting base, and the actuator element and the anchoring-point portion are separate from each other.

In some embodiments, the power end is located between the fulcrum and the resistance end, and an orthographic projection of the anchoring-point portion on the touch substrate is closer to a geometric center of the touch surface.

In some embodiments, the tactile-feedback module includes a plurality of instances of the lever, the fulcrums of the plurality of levers are disposed on a same anchoring-point portion, and the orthographic projection of the anchoring-point portion on the touch substrate covers the geometric center.

In some embodiments, the tactile-feedback module includes a plurality of instances of the lever, the plurality of levers are connected to a same actuator element, and the actuator element is of a first closed-loop structure surrounding the anchoring-point portion by one circle.

In some embodiments, the plurality of levers include a first lever group and a second lever group, and in a second direction, the power ends of the levers in the first lever group and the power ends of the levers in the second lever group are centrally arranged on the first closed-loop structure, wherein the second direction is perpendicular to a direction of a connecting line between the first lever group and the second lever group.

In some embodiments, the tactile-feedback module includes a plurality of instances of the actuator element and a plurality of instances of the lever, the plurality of levers include a third lever group and a fourth lever group, the levers in the third lever group are connected to a same actuator element, the levers in the fourth lever group are connected to a same actuator element, and the levers in the third lever group and the levers in the fourth lever group are connected to different actuator elements.

In some embodiments, the fulcrum is located between the power end and the resistance end, and an orthographic projection of the actuator element on the touch substrate is closer to a geometric center of the touch surface.

In some embodiments, the tactile-feedback module includes a plurality of instances of the lever, the plurality of levers are connected to a same actuator element, and the orthographic projection of the actuator element on the touch substrate covers the geometric center.

In some embodiments, the tactile-feedback module includes a plurality of instances of the lever, the fulcrums of the plurality of levers are disposed on a same anchoring-point portion, and the anchoring-point portion is of a second closed-loop structure surrounding the actuator element by one circle.

In some embodiments, the tactile-feedback module includes at least two instances of the lever, and the at least two levers share one power end, and are connected to each other at a position of the power end to form an integral structure.

In some embodiments, a distance between the fulcrum and the power end is less than a distance between the fulcrum and the resistance end.

In some embodiments, the tactile-feedback module further includes a plurality of hinges, each of the hinges includes two connecting faces that are opposite to each other, and the plurality of hinges include at least one of:
  a first hinge, wherein one of the two connecting faces is connected to the power end, and the other of the two connecting faces is connected to the actuator element;
  a second hinge, wherein one of the two connecting faces is connected to the touch substrate, and the other of the two connecting faces is connected to the resistance end; and
  a third hinge, wherein one of the two connecting faces is connected to the fulcrum of the lever, and the other of the two connecting faces is connected to the anchoring-point portion.

In some embodiments, each of the hinges includes a side face, the side face is connected between the two connecting faces, and the side face has a groove that is recessed towards an interior of the hinge.

In some embodiments, in a longitudinal cross section of the hinge, a shape of the groove includes at least one of a semicircular shape, a semi-elliptical shape, a polygon and an irregular pattern, wherein the longitudinal cross section is a cross section perpendicular to each of the two connecting faces.

In some embodiments, the groove is of a closed structure or unclosed structure surrounding the hinge by one circle.

In some embodiments, in a direction parallel to the touch surface, a ratio of a minimum width of the hinges to a maximum width of the hinges is greater than or equal to 0.1, and less than or equal to 0.9.

In some embodiments, an elasticity modulus of each of the hinges is greater than or equal to 10 GPa, and less than or equal to 300 GPa.

In some embodiments, connections of the hinges to the lever, the actuator element, the touch substrate and/or the anchoring-point portion are rigid connections.

In some embodiments, connection between the actuator element and the supporting base is a flexible connection.

In some embodiments, an orthographic projection of the resistance end on the touch substrate is closer to an edge of the touch surface; and/or
 a shape of the touch surface is a polygon, and an orthographic projection of the resistance end on the touch substrate is closer to interior angles of the polygon.

In some embodiments, the lever includes a plurality of extending portions whose heads and tails are sequentially connected; and
 extending directions of the plurality of extending portions are the same, or extending directions of at least two extending portions are different.

In some embodiments, the tactile-feedback module includes a plurality of instances of the lever, the plurality of levers are divided into a fifth lever group and a sixth lever group, and an orthographic projection on the touch substrate of the fifth lever group and an orthographic projection on the touch substrate of the sixth lever group are centrosymmetric with respect to a first position.

In some embodiments, an orthographic projection of the first position on the touch substrate is located at a geometric center of the touch surface.

In some embodiments, a boundary of an orthographic projection of the actuator element on the touch substrate includes a first line segment, the lever includes a first extending portion, and an orthographic projection of the first extending portion on the touch substrate intersects with and is substantially perpendicular to the first line segment.

In some embodiments, the actuator element includes a single layer of piezoelectric ceramic, or a plurality of layers of piezoelectric ceramic arranged in layer configuration in a normal direction of the touch substrate.

In some embodiments, the lever includes a plurality of sub-levers cascaded to each other, a resistance end of a preceding one stage of the sub-levers is connected to a power end of a subsequent one stage of the sub-levers, a power end of a first-stage sub-lever is connected to the actuator element, and a resistance end of a last-stage sub-lever is connected to the touch substrate.

An electronic device is provided by the present disclosure, wherein the electronic device includes a display panel, and the tactile-feedback module according to any one of the above embodiments.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

FIG. 7A to FIG. 7H exemplarily show schematic sectional structural diagrams of some types of hinges;

DETAILED DESCRIPTION

Figure 1A:
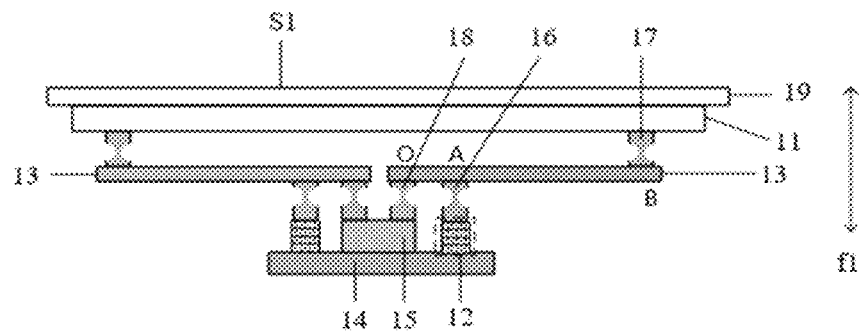
FIG. 1A and FIG. 1B exemplarily show schematic structural diagrams of a first type of tactile-feedback module.

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

With the development of the technique of touch controlling, human-machine interaction is increasingly more performed on touch screens. Currently, tactile feedback is mainly applied in mobile phones, tablet personal computers, notebook touch panels and so on. Taking into consideration the aspects such as the safety and the reliability, the touch modules applied in the fields such as cars, high-speed railway, aerospace and industrial devices have the characteristics of a large size and a high mass. Currently, it is difficult to realize the effect of tactile feedback in high-mass touch modules. Realizing tactile feedback on high-mass touch modules is of a great significance and value for enriching the user experience and so on.

Referring to FIG. 1A to FIG. 6B, FIG. 1A to FIG. 6B show schematic structural diagrams of some types of tactile-feedback module according to the present disclosure. In FIG. 1A to FIG. 6B, FIG. 1A, FIG. 2A, FIG. 3A, FIG. 4A, FIG. 5A and FIG. 6A are side views of the tactile-feedback modules, and FIG. 1B, FIG. 2B, FIG. 3B, FIG. 4B, FIG. 5B and FIG. 6B is top views of the tactile-feedback modules.

As shown in any one of FIG. 1A to FIG. 6B, the tactile-feedback module includes: a touch substrate 11 having a touch surface S1; an actuator element 12 disposed at the side of the touch substrate 11 away from the touch surface S1 and configured to generate vibration in a first direction f1, wherein the first direction f1 intersects with the touch surface S1; and a lever 13 located between the actuator element 12 and the touch substrate 11, wherein the power end A of the lever 13 is connected to the actuator element 12, the resistance end B of the lever 13 is connected to the touch substrate 11, in a stationary state of the actuator element 12, the plane where the lever 13 is located is parallel to the touch surface S1, and the lever 13 is configured to, under driving of the actuator element 12, drive the touch substrate 11 to vibrate.

As an example, as shown in FIG. 1A to FIG. 6B, the first direction f1 and the touch surface S1 are perpendicular to each other. Under the effect of the actuator element 12 and the lever 13, the vibration direction of the touch substrate 11 and the vibration direction of the actuator element 12 are the same.

As shown in any one of FIG. 1A to FIG. 6B, the fulcrum of the lever 13 is located at the point O, the power end is located at the point A, and the resistance end is located at the point B. The distance between the power end A and the fulcrum O is $R_A$, and the distance between the resistance end B and the fulcrum O is $R_B$. According to the characteristic of moment balance of the lever 13, when the actuator element 12 located at the power end A is activated and vibrates, the ratio of the displacement DB generated by the touch substrate 11 located at the resistance end B to the displacement DA of the actuator element 12 satisfies $D_B/D_A=R_B/R_A$. It can be seen from the above formula that, by regulating the ratio of $R_B$ to $R_A$, a magnitude of the displacement of the touch substrate 11 can be regulated.

The design of lever moment is employed by the tactile-feedback module according to the present disclosure, and by reasonably configuring the magnitudes of $R_B$ and $R_A$, the displacement generated by the actuator element 12 can be amplified, to cause the touch substrate 11 to generate vibration with the amplified displacement. In this way, the input power or the size of the actuator element 12 can be reduced, the power consumption is reduced, the tactile feedback of high-mass touch substrates 11 can also be realized or the vibrating amplitude of the touch substrate 11 is increased.

In some embodiments, as shown in any one of FIG. 1A to FIG. 6B, an orthographic projection of the resistance end B on the touch substrate 11 is closer to the edge of the touch surface S1. Accordingly, the lever 13 of a high length can be disposed, which facilitates to increase the amplification factor of the displacement of the touch substrate 11.

In some embodiments, as shown in any one of FIG. 1A to FIG. 6B, a shape of the touch surface S1 is a polygon, and the orthographic projection of the resistance end B on the touch substrate 11 is closer to the interior angles of the polygon. Accordingly, the length of the lever 13 can be increased to the largest extent, which facilitates to increase the amplification factor of the displacement of the touch substrate 11.

As an example, in FIG. 1A to FIG. 6B, the shape of the touch surface S1 is rectangular, the tactile-feedback module includes four levers 13, and the power ends B of the four levers 13 are closer to the different interior angles of the rectangle.

In some embodiments, as shown in any one of FIG. 1A, FIG. 1B, and FIG. 4A to FIG. 6B, the lever 13 includes a plurality of extending portions L whose heads and tails are sequentially connected, and the extending directions of the plurality of extending portions L are the same.

In some embodiments, as shown in FIG. 2A, FIG. 2B, FIG. 3A or FIG. 3B, the lever 13 includes a plurality of extending portions L whose heads and tails are sequentially connected, and the extending directions of at least two extending portions L are different.

As an example, in FIG. 2A, FIG. 2B, FIG. 3A and FIG. 3B, the heads and the tails of the plurality of extending portions L are sequentially connected to form the lever 13 of a bent structure, and the distance $R_B$ between the resistance end B and the fulcrum O is the sum of the lengths of the extending portions L located between the resistance end B and the fulcrum O. Therefore, the distance $R_B$ between the resistance end B and the fulcrum O can be increased, and thus the ratio of $R_B$ to $R_A$ is increased, and the amplification factor of the displacement of the touch substrate 11 is increased.

In some embodiments, as shown in any one of FIG. 1A to FIG. 6B, the tactile-feedback module further includes: a supporting base 14 located at the side of the actuator element 12 away from the touch substrate 11; and an anchoring-point portion 15 located between the supporting base 14 and the lever 13, and fixed on the supporting base 14. The fulcrum O of the lever 13 is disposed at the side of the anchoring-point portion 15 away from the supporting base 14, the actuator element 12 is fixed on the supporting base 14, and the actuator element 12 and the anchoring-point portion 15 are separate from each other.

As an example, the supporting base 14 and the anchoring-point portion 15 may be of an integral structure, and may also be two independent components, which is not limited in the present disclosure.

As an example, the actuator element 12 may be fixed on the supporting base 14 by using a screw, and the actuator element 12 may be applied a certain prestressing force by using a screw.

As an example, a layer of soft adhesive may also be disposed between the actuator element 12 and the supporting base 14, to realize the flexible connection between the actuator element 12 and the supporting base 14, in this way, the vibration of the actuator element 12 can be prevented from being transmitted to the supporting base 14.

As an example, the shape of the orthographic projection of the supporting base 14 on the touch substrate 11 may be a circle, a rectangle (for example, the square shown in FIG. 1A to FIG. 6B), an elliptical shape and so on, which is not limited in the present disclosure.

In some embodiments, as shown in any one of FIG. 1A to FIG. 5B, the power end A is located between the fulcrum O and the resistance end B.

As an example, as shown in any one of FIG. 1A to FIG. 5B, the orthographic projection of the anchoring-point portion 15 on the touch substrate 11 is closer to the geometric center of the touch surface S1, and the actuator element 12 is located at the side of the anchoring-point portion 15 away from the geometric center.

Correspondingly, in FIG. 1A to FIG. 5B, the orthographic projection of the fulcrum O on the touch substrate 11 is closer to the geometric center of the touch surface S1, the orthographic projection of the resistance end B on the touch substrate 11 is closer to the edge of the touch surface S1, the power end A is located between the fulcrum O and the resistance end B.

In some embodiments, as shown in any one of FIG. 1A to FIG. 5B, the tactile-feedback module includes a plurality of levers 13, the fulcrums O of the plurality of levers 13 are disposed on the same anchoring-point portion 15, and the orthographic projection of the anchoring-point portion 15 on the touch substrate 11 covers the geometric center.

By disposing the shared anchoring-point portion 15 at the position of the geometric center of the touch surface S1, a plurality of levers 13 of equal lengths are facilitated to be provided, thereby the uniformity of the tactile feedback on the touch surface S1 is improved.

As an example, the anchoring-point portion 15 may be of a cylindrical structure (for example, as shown in FIGS. 1A, 1B, 2A, 2B, 4A, 4B, 5A and 5B), and may also be of a prismatic structure (for example, the tetragonal prism structure shown in FIG. 3A and FIG. 3B), which is not limited in the present disclosure.

In some embodiments, as shown in any one of FIG. 1A to FIG. 3B, the tactile-feedback module includes a plurality of levers 13, the plurality of levers 13 are connected to the same actuator element 12, and the actuator element 12 is of a first closed-loop structure surrounding the anchoring-point portion 15 by one circle.

In the present embodiment, the actuator element 12 connected to the plurality of levers 13 is of an integral structure, in this way, the difficulty in processing the actuator element 12 can be reduced, and the uniformity of the tactile feedback on the touch surface S1 is facilitated to be improved.

As an example, a shape of the outer contour of the orthographic projection of the actuator element 12 on the touch substrate 11 includes at least one of a regular pattern such as a polygon (for example, the square shown in FIG. 3A and FIG. 3B), an elliptical shape (for example, the circle shown in FIG. 1A, FIG. 1B, FIG. 2A and FIG. 2B) and a sector shape and an irregular pattern. The polygon may be a chamfered polygon or a non-chamfered polygon. The shapes of the inner contour and the outer contour of the orthographic projection of the actuator element 12 on the touch substrate 11 may be the same.

In some embodiments, as shown in FIG. 2A, FIG. 2B, FIG. 3A or FIG. 3B, the plurality of levers 13 include a first lever group 21 and a second lever group 22, and in a second direction f2, the power ends A of the levers 13 in the first lever group 21 and the power ends A of the levers 13 in the second lever group 22 are centrally arranged on the first closed-loop structure, wherein the second direction f2 is perpendicular to the direction f3 of a connecting line between the first lever group 21 and the second lever group 22.

Figure 2A:
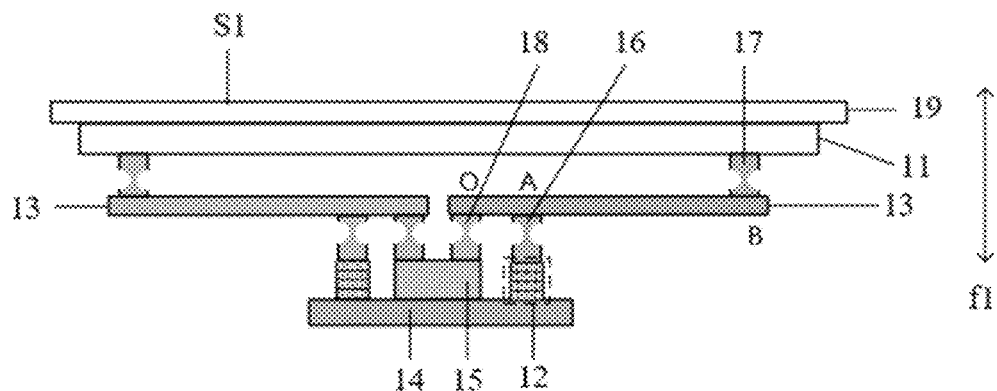
FIG. 2A and FIG. 2B exemplarily show schematic structural diagrams of a second type of tactile-feedback module.
Figure 2B:
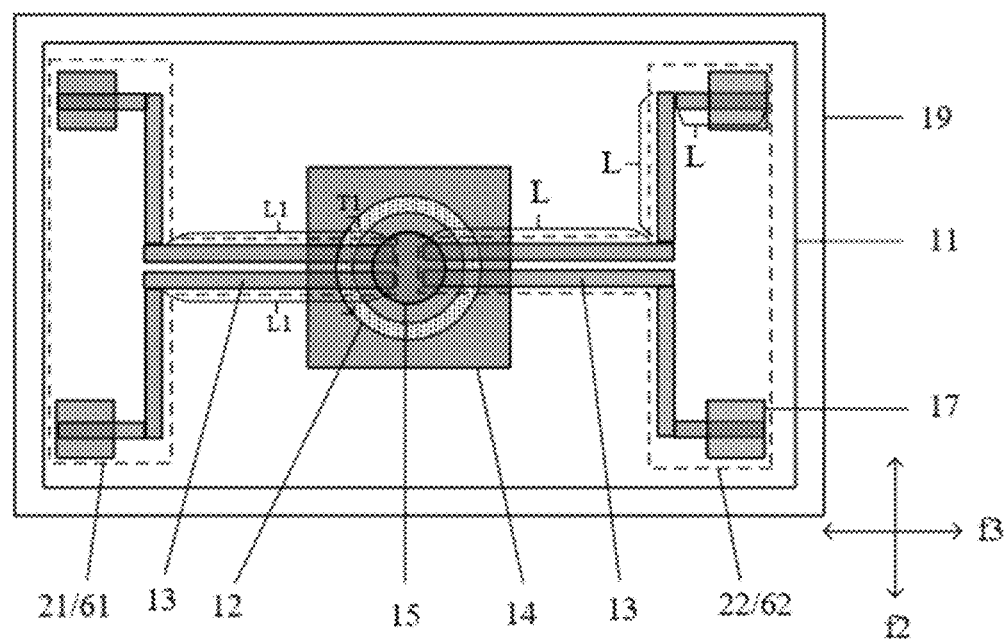

As an example, in FIG. 2A and FIG. 2B, the first closed-loop structure is a closed round-ring structure. The first lever group 21 includes two levers 13 located at the left side, and both of the connection points between the two levers 13 in the first lever group 21 and the actuator element 12 are closer to the circle center of the circular ring in the second direction f2; in other words, in the second direction f2, the power ends A of the levers 13 in the first lever group 21 are centrally arranged on the actuator element 12. The second lever group 22 includes two levers 13 located at the right side, and both of the connection points between the two levers 13 in the second lever group 22 and the actuator element 12 are closer to the circle center of the circular ring in the second direction f2; in other words, in the second direction f2, the power ends A of the levers 13 in the second lever group 22 are centrally arranged on the actuator element 12.

Figure 3A:
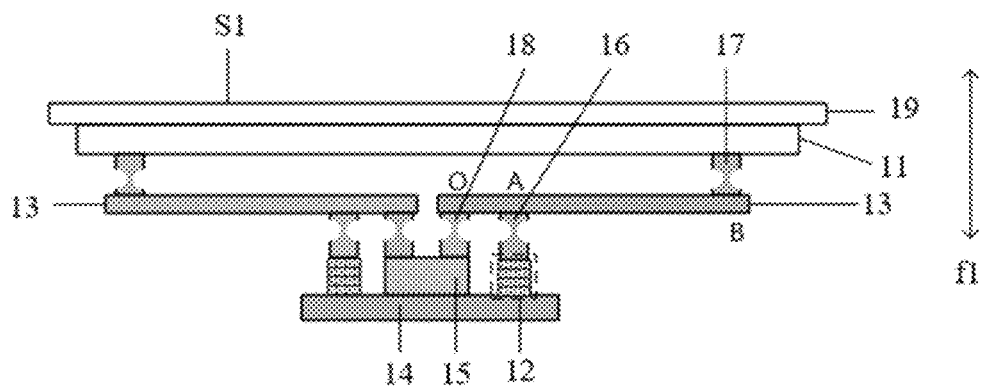
FIG. 3A and FIG. 3B exemplarily show schematic structural diagrams of a third type of tactile-feedback module.
Figure 3B:
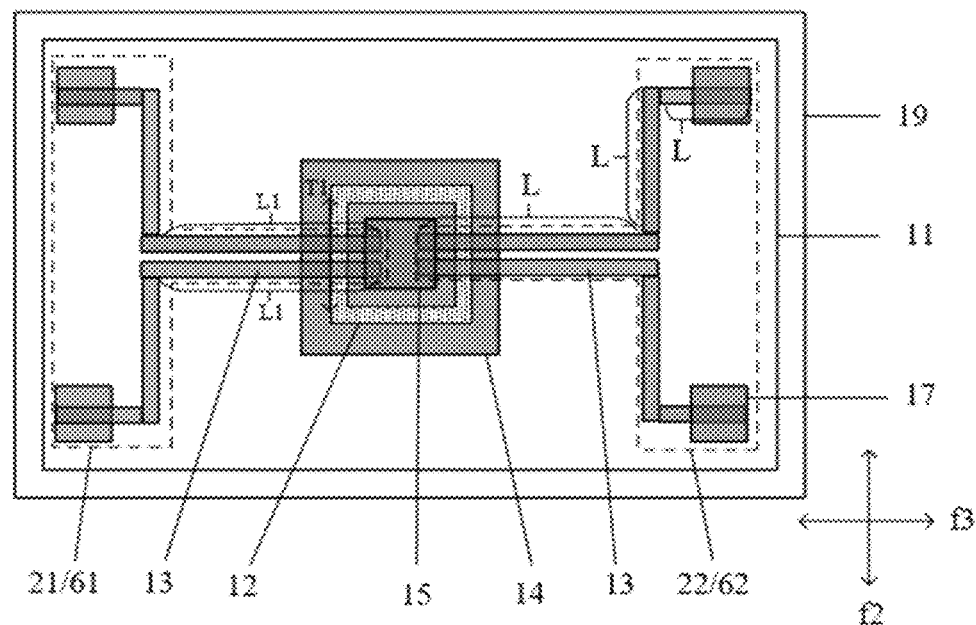

As an example, in FIG. 3A and FIG. 3B, the first closed-loop structure is a closed square-ring structure, the orthographic projection on the touch substrate 11 of the actuator element 12 of the square-ring structure includes a left side ring edge, an upper side ring edge, a right side ring edge and a lower side ring edge whose heads and tails are sequentially connected, wherein the left side ring edge and the right side ring edge extend in the second direction f2. The first lever group 21 includes two levers 13 located at the left side, and both of the connection points between the two levers 13 in the first lever group 21 and the actuator element 12 are closer to the midpoint of the left side ring edge; in other words, in the second direction f2, the power ends A of the levers 13 in the first lever group 21 are centrally arranged on the actuator element 12. The second lever group 22 includes two levers 13 located at the right side, and both of the connection points between the two levers 13 in the second lever group 22 and the actuator element 12 are closer to the midpoint of the right side ring edge; in other words, in the second direction f2, the power ends A of the levers 13 in the second lever group 22 are centrally arranged on the actuator element 12.

In some embodiments, in the direction f3 of the connecting line between the first lever group 21 and the second lever group 22, the connection points between the levers 13 in the first lever group 21 and the actuator element 12 and the connection points between the levers 13 in the second lever group 22 and the actuator element 12 face each other.

As an example, in FIG. 2A and FIG. 2B, the first closed-loop structure is a closed round-ring structure. The first lever group 21 includes two levers 13 located at the left side, and the second lever group 22 includes two levers 13 located at the right side. The connection points between the two levers 13 in the first lever group 21 and the actuator element 12 are located at the left side of the circle center of the circular ring, and the connection points between the two levers 13 in the second lever group 22 and the actuator element 12 are located at the right side of the circle center. In other words, in the direction f3 of the connecting line between the first lever group 21 and the second lever group 22, the connection points between the two levers 13 in the first lever group 21 and the actuator element 12 and the connection points between the two levers 13 in the second lever group 22 and the actuator element 12 face each other, and are located at the two opposite sides of the circle center.

As an example, in FIG. 3A and FIG. 3B, the first closed-loop structure is a closed square-ring structure, and the orthographic projection on the touch substrate 11 of the actuator element 12 of the square-ring structure includes a left side ring edge, an upper side ring edge, a right side ring edge and a lower side ring edge whose heads and tails are sequentially connected. The first lever group 21 includes two levers 13 located at the left side, the second lever group 22 includes two levers 13 located at the right side, the two levers 13 in the first lever group 21 are connected to the left side ring edge of the actuator element 12, and the two levers 13 in the second lever group 22 are connected to the right side ring edge of the actuator element 12. In other words, in the direction f3 of the connecting line between the first lever group 21 and the second lever group 22, the connection points between the two levers 13 in the first lever group 21 and the actuator element 12 and the connection points between the two levers 13 in the second lever group 22 and the actuator element 12 face each other, and are located at the two opposite sides of the center of the square ring.

In some embodiments, as shown in FIG. 4A, 4B, 5A or 5B, the tactile-feedback module includes a plurality of actuator elements 12 and a plurality of levers 13, the plurality of levers 13 include a third lever group 41 and a fourth lever group 42, the levers 13 in the third lever group 41 are connected to the same actuator element 12, the levers 13 in the fourth lever group 42 are connected to the same actuator element 12, and the levers 13 in the third lever group 41 and the levers 13 in the fourth lever group 42 are connected to different actuator elements 12. Each of the third lever group 41 and the fourth lever group 42 includes one or more levers 13.

In the present embodiment, the tactile-feedback module includes at least two actuator elements 12 that are separately arranged, and each of the actuator elements 12 is correspondingly connected to one or more levers 13. By using the plurality of separately arranged actuator elements 12, the supporting base 14 and the levers 13 can be manufactured into an integral structure, which facilitates to increase the efficiency of the assembling of the tactile-feedback module. In the assembling, the actuator elements 12 are placed between the supporting base 14 and the levers 13 from the side face.

In FIG. 4A, FIG. 4B, FIG. 5A and FIG. 5B, the plurality of separately arranged actuator elements 12 form an unclosed-loop structure and are disposed at the periphery of the anchoring-point portion 15.

Figure 4A:
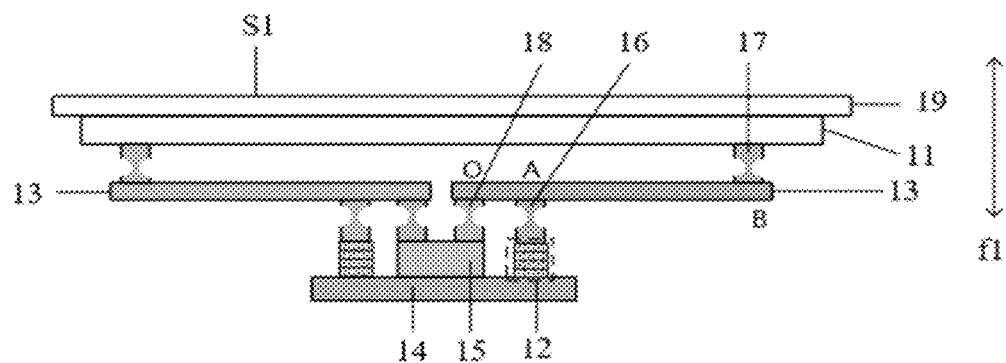
FIG. 4A and FIG. 4B exemplarily show schematic structural diagrams of a fourth type of tactile-feedback module.
Figure 4B:
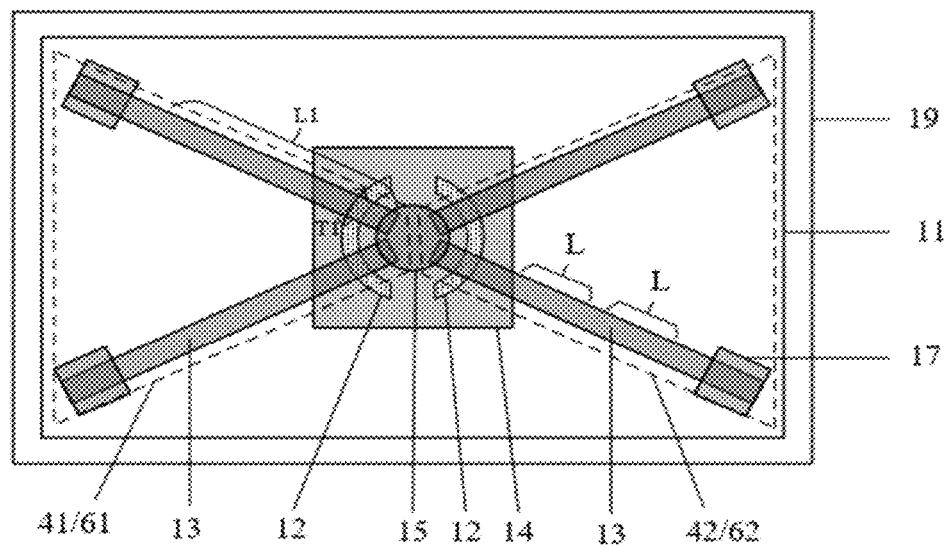

As an example, in FIG. 4A and FIG. 4B, the tactile-feedback module includes two actuator elements 12, which are located at the left side and at the right side of the geometric center of the touch surface S1. The third lever group 41 includes two levers 13 located at the left side, the two levers 13 in the third lever group 41 are connected to the actuator element 12 at the left side, the fourth lever group 42 includes two levers 13 located at the right side, and the two levers 13 in the fourth lever group 42 are connected to the actuator element 12 at the right side. In FIG. 2A and FIG. 2B, each of the actuator elements 12 is correspondingly connected to two levers 13.

Figure 5A:
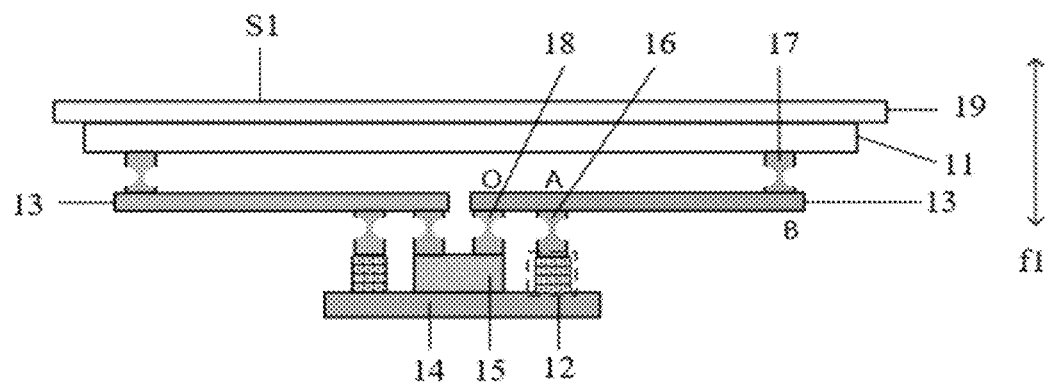
FIG. 5A and FIG. 5B exemplarily show schematic structural diagrams of a fifth type of tactile-feedback module.
Figure 5B:
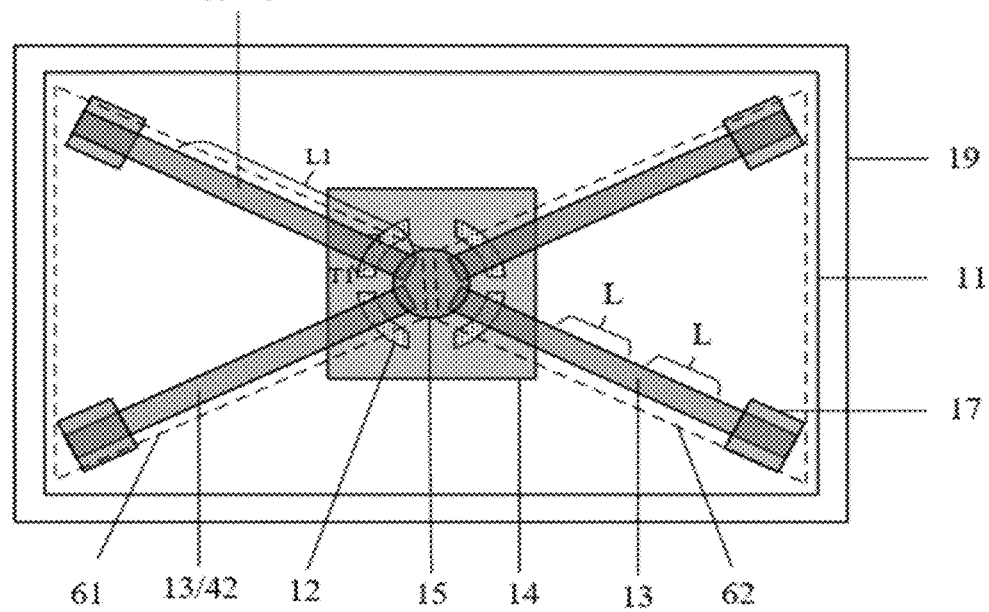

As an example, in FIG. 5A and FIG. 5B, the tactile-feedback module includes four actuator elements 12, which are located at the top left side, the bottom left side, the top right side and the bottom right side of the geometric center of the touch surface S1. The third lever group 41 includes, for example, one lever 13 located at the top left side, the lever 13 at the top left side is connected to the actuator element 12 at the top left side, the fourth lever group 42 includes, for example, one lever 13 located at the bottom left side, and the lever 13 at the bottom left side is connected to the actuator element 12 at the bottom left side. In FIG. 3A and FIG. 3B, each of the actuator elements 12 is correspondingly connected to one lever 13.

Figure 6A:
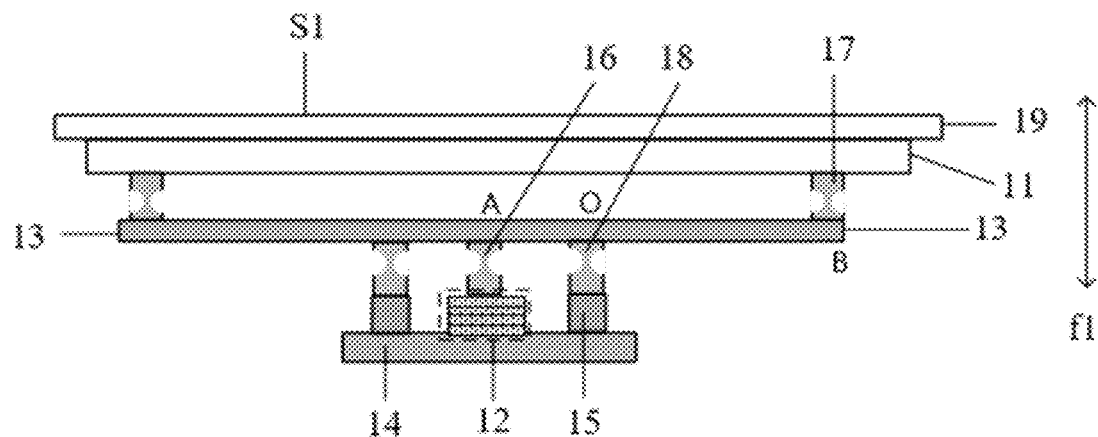
FIG. 6A and FIG. 6B exemplarily show schematic structural diagrams of a sixth type of tactile-feedback module.
Figure 6B:
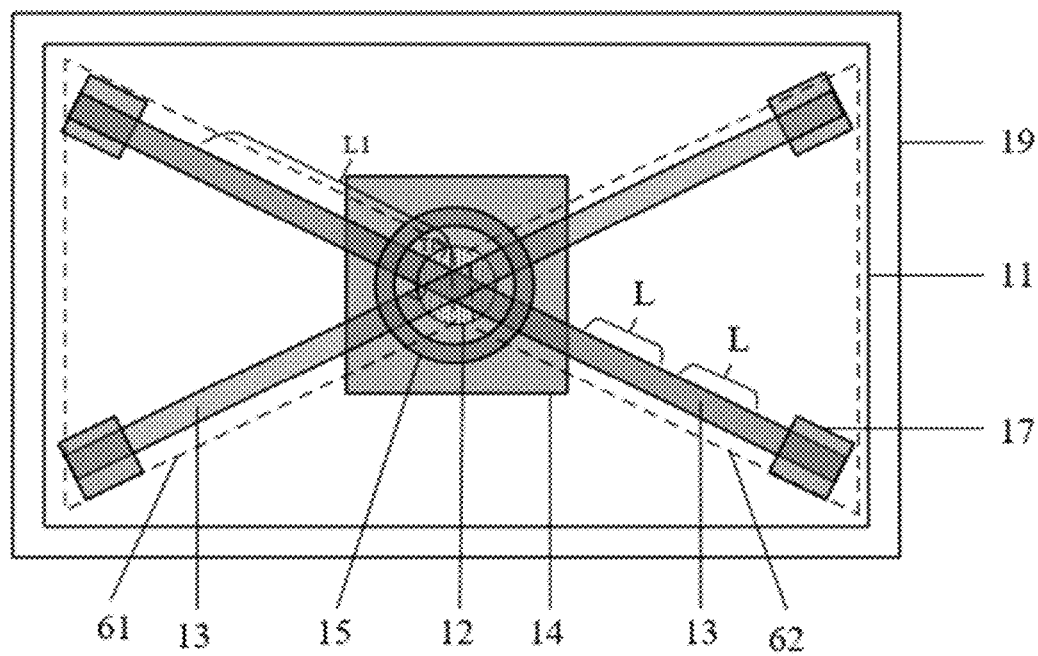

In some embodiments, as shown in FIG. 6A and FIG. 6B, the fulcrum O is located between the power end A and the resistance end B.

As an example, as shown in FIG. 6A and FIG. 6B, the orthographic projection of the actuator element 12 on the touch substrate 11 is closer to the geometric center of the touch surface S1, and the anchoring-point portion 15 is located at the side of the actuator element 12 away from the geometric center.

Correspondingly, in FIG. 6A and FIG. 6B, the orthographic projection of the power end A on the touch substrate 11 is closer to the geometric center of the touch surface S1, the orthographic projection of the resistance end B on the touch substrate 11 is closer to the edge of the touch surface S1, and the fulcrum O is located between the power end A and the resistance end B.

In some embodiments, as shown in FIG. 6A and FIG. 6B, the tactile-feedback module includes a plurality of levers 13, the plurality of levers 13 are connected to the same actuator element 12, and the orthographic projection of the actuator element 12 on the touch substrate 11 covers the geometric center.

In the present embodiment, by disposing the shared actuator element 12, the uniformity of the tactile feedback on the touch surface S1 can be improved. By disposing the actuator element 12 at the geometric center of the touch surface S1, the ratio of $R_B$ to $R_A$ is facilitated to be increased, thereby the amplification factor of the displacement of the touch substrate 11 is increased, and a plurality of levers 13 of equal lengths is facilitated to be provided to further improve the uniformity of the tactile feedback.

As an example, the actuator element 12 may be of a cylindrical structure (for example, as shown in FIG. 6A and FIG. 6B), and may also be of a prismatic structure, which is not limited in the present disclosure.

In some embodiments, as shown in FIG. 6A and FIG. 6B, the tactile-feedback module includes a plurality of levers 13, the fulcrums O of the plurality of levers 13 are disposed on the same anchoring-point portion 15, and the anchoring-point portion 15 is of a second closed-loop structure surrounding the actuator element 12 by one circle.

As an example, the shape of the outer contour of the orthographic projection of the anchoring-point portion 15 on the touch substrate 11 includes at least one of a regular pattern such as a polygon, an elliptical shape (for example, the circle shown in FIG. 6A and FIG. 6B) and a sector shape and an irregular pattern. The polygon may be a chamfered polygon or a non-chamfered polygon. The shape of the outer contour of the orthographic projection of the anchoring-point portion 15 and the shape of the inner contour of the orthographic projection of the anchoring-point portion 15 on the touch substrate 11 may be the same.

In some embodiments, as shown in FIG. 6A and FIG. 6B, the tactile-feedback module includes at least two levers 13, the at least two levers 13 share one power end A, and are connected to each other at the position of the power end A to form an integral structure.

As an example, in FIG. 6A and FIG. 6B, the tactile-feedback module includes four levers 13, and the four levers 13 share one power end A, and are connected to each other at the position of the power end A to form an integral structure.

In some embodiments, the tactile-feedback module includes at least two levers 13, and the at least two levers 13 are located in the same straight line. As shown in FIG. 6A and FIG. 6B, the tactile-feedback module includes four levers 13, which are located at the top left side, the bottom left side, the top right side and the bottom right side of the geometric center of the touch surface S1. The lever 13 at the top left side and the lever 13 at the bottom right side are located in the same straight line, and the straight line may coincide with one of the diagonal lines of the touch surface S1. The lever 13 at the bottom left side and the lever 13 at the top right side are located in the same straight line, and the straight line may coincide with the other of the diagonal lines of the touch surface S1.

In some embodiments, as shown in FIG. 6A and FIG. 6B, the distance $R_A$ between the fulcrum O and the power end A is less than the distance $R_B$ between the fulcrum O and the resistance end B. Accordingly, the lever 13 forms a labor-saving lever, thus the input power or the size of the actuator element can be reduced, and without increasing the power consumption, the tactile feedback of high-mass touch substrates can be realized or the vibrating amplitude of the touch substrate is increased.

In some embodiments, as shown in any one of FIG. 1A to FIG. 6B, the tactile-feedback module further includes a plurality of hinges, and each of the hinges includes two connecting faces that are opposite. The hinges may be flexible hinges, and can have certain deformation under an external force.

As an example, as shown in any one of FIG. 1A to FIG. 6B, the plurality of hinges include a first hinge 16, one of the two connecting faces of the first hinge 16 is connected to the power end A, and the other of the two connecting faces is connected to the actuator element 12.

As an example, as shown in any one of FIG. 1A to FIG. 6B, the plurality of hinges include a second hinge 17, one of the two connecting faces of the second hinge 17 is connected to the touch substrate 11, and the other of the two connecting faces is connected to the resistance end B. By disposing the flexible hinge between the touch substrate 11 and the resistance end B of the lever 13, the touch substrate 11 can be cushioned and protected.

As an example, as shown in any one of FIG. 1A to FIG. 6B, the plurality of hinges include a third hinge 18, one of the two connecting faces of the third hinge 18 is connected to the fulcrum O of the lever 13, and the other of the two connecting faces is connected to the anchoring-point portion 15.

In some embodiments, referring to FIG. 7A to FIG. 7H, FIG. 7A to FIG. 7H show schematic sectional structural diagrams of some types of hinges. Each of the hinges includes a side face S2, the side face S2 is connected between the two connecting faces, and the side face S2 has a groove 71 that is recessed towards an interior of the hinge.

In some embodiments, in the longitudinal cross section of the hinge, the shape of the groove 71 includes at least one of a regular pattern such as a semicircular shape (for example, as shown in FIG. 7A and FIG. 7E), a semi-elliptical shape (for example, as shown in FIG. 7B and FIG. 7F) and a polygon and an irregular pattern, wherein the longitudinal cross section is a cross section perpendicular to the connecting faces. The polygon may be a chamfered polygon (for example, as shown in FIG. 7D and FIG. 7H), and may also be a non-chamfered polygon (for example, as shown in FIG. 7C and FIG. 7G).

In some embodiments, the groove 71 is of a closed structure (for example, as shown in FIG. 7A to FIG. 7D) or unclosed structure (for example, as shown in FIG. 7E to FIG. 7H) surrounding the hinge by one circle.

In some embodiments, the hinges may be of an axially symmetric structure (for example, as shown in FIG. 7A to FIG. 7D), and may also be of a non-axially symmetric structure (for example, as shown in FIG. 7E to FIG. 7H).

In some embodiments, in the direction parallel to the touch surface S1, the ratio of the minimum width of the hinges to the maximum width of the hinges is greater than or equal to 0.1, and less than or equal to 0.9, for example, 0.4, 0.5 and 0.6. In this way, the safety and the reliability of the tactile-feedback module can be improved, and that the hinges have certain flexibility and deformability can be ensured.

In some embodiments, an elasticity modulus of each of the hinges is greater than or equal to 10 GPa, and less than or equal to 300 GPa, for example, tens of GPa. Accordingly, it can be ensured that the hinges have certain flexibility and deformability.

As an example, the material of the hinges may be tungsten steel, stainless steel and so on, which is not limited in the present disclosure.

In some embodiments, the connections of the hinges to the lever 13, the actuator element 12, the touch substrate 11 and/or the anchoring-point portion 15 are rigid connections.

As an example, as shown in any one of FIG. 1A to FIG. 6B, the connections of the first hinge 16 to the power end A and the actuator element 12 are rigid connections, and the connections of the second hinge 17 to the touch substrate 11 and the resistance end B are rigid connections. Accordingly, by configuring that the connection between the hinge and the lever 13, the connection between the hinge and the actuator element 12 and the connection between the hinge and the touch substrate 11 are rigid connections, it can be ensured that the vibration of the actuator element 12 can be transmitted to the surface of the touch substrate 11 nearly without attenuation.

In FIG. 1A to FIG. 6B, the connections of the third hinge 18 to the fulcrum O of the lever 13 and the anchoring-point portion 15 may also be rigid connections.

As an example, the rigid connection may, for example, be adhesive bonding by using a rigid adhesive such as an epoxy-resin adhesive, may also be welding connection, may also be screw connection, and so on.

In some embodiments, one or more of the supporting base 14, the anchoring-point portion 15, the hinges and the levers 13 may be of an integral structure, or employ the same material.

In some embodiments, the tactile-feedback module includes a plurality of levers 13, and the quantity of the levers included by the tactile-feedback module may be an even number, for example, 2, 4 (for example, as shown in FIG. 1A to FIG. 6B), 6, 8 and so on. The quantity of the levers included by the tactile-feedback module may also be an odd number, for example, 1, 3, 5 and so on.

In some embodiments, as shown in any one of FIG. 1A to FIG. 6B, the plurality of levers 13 included by the tactile-feedback module are divided into a fifth lever group 61 and a sixth lever group 62, and the orthographic projection on the touch substrate 11 of the fifth lever group 61 and the orthographic projection on the touch substrate 11 of the sixth lever group 62 are centrosymmetric with respect to a first position. Accordingly, the uniformity of the tactile feedback on the touch surface S1 can be improved. In the present embodiment, the quantity of the levers included by the tactile-feedback module is an even number.

As an example, as shown in any one of FIG. 1A to FIG. 6B, the orthographic projection of the first position on the touch substrate 11 is located at the geometric center of the touch surface S1.

In some embodiments, as shown in any one of FIG. 1A to FIG. 6B, the boundary of the orthographic projection of the actuator element 12 on the touch substrate 11 includes a first line segment T1, the lever 13 includes a first extending portion L1, and the orthographic projection of the first extending portion L1 on the touch substrate 11 intersects with and is substantially perpendicular to the first line segment T1.

Figure 1B:
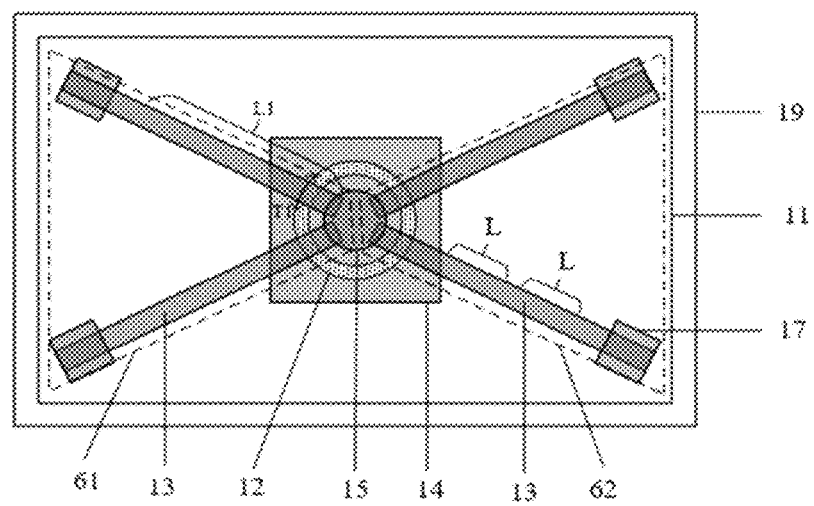

As an example, in FIG. 1A and FIG. 1B, the orthographic projection of the actuator element 12 on the touch substrate 11 is a circular ring, and the boundary of the orthographic projection of the actuator element 12 on the touch substrate 11 is a circle. In the orthographic projections on the touch substrate 11, the first line segment T1 is a section of circular arc that intersects with the first extending portion L1, and the extending portion of the first extending portion L1 is in the normal direction of the intersection-point position in the first line segment T1.

As an example, in FIG. 2A and FIG. 2B, the orthographic projection of the actuator element 12 on the touch substrate 11 is a circular ring, and the boundary of the orthographic projection of the actuator element 12 on the touch substrate 11 is a circle. In the orthographic projections on the touch substrate 11, the first extending portions L1 of the two levers 13 at the left side are parallel to each other and have two intersection points with the circle, the midpoint between the two intersection points in the circle is the intermediate point, the extending directions of the first extending portions L1 of the two levers 13 at the left side are in the normal direction of the intermediate point in the first line segment T1, and the first extending portions L1 of the two levers 13 at the left side are disposed closely at the two sides of the normal of the intermediate point. The two levers 13 at the right side are configured similarly, and are not discussed further herein. In FIG. 2A and FIG. 2B, in the orthographic projections on the touch substrate 11, the extending portion of the first extending portions L1 and the normal direction of the first line segment T1 are substantially parallel, or the extending portion of the first extending portions L1 and the first line segment T1 are substantially perpendicular.

As an example, in FIG. 3A and FIG. 3B, the orthographic projection of the actuator element 12 on the touch substrate 11 is a square ring, and the boundary of the orthographic projection of the actuator element 12 on the touch substrate 11 is a square. In the orthographic projections on the touch substrate 11, the first line segment T1 is a lateral side that intersects with the first extending portions L1, and the extending portion of the first extending portions L1 is perpendicular to the first line segment T1.

As an example, in FIG. 4A and FIG. 4B, the tactile-feedback module includes two actuator elements 12, the orthographic projections of the two actuator elements 12 on the touch substrate 11 form an unclosed circular ring, and the boundaries of the orthographic projections of the two actuator elements 12 on the touch substrate 11 are two circular arcs that are separately arranged and concentric. In the orthographic projections on the touch substrate 11, the first line segment T1 is a section of circular arc that intersects with the first extending portions L1, and the extending portion of the first extending portions L1 is in the normal direction of the intersection-point position in the first line segment T1.

As an example, in FIG. 5A and FIG. 5B, the tactile-feedback module includes four actuator elements 12, the orthographic projections of the four actuator elements 12 on the touch substrate 11 form an unclosed circular ring, and the boundaries of the orthographic projections of the four actuator elements 12 on the touch substrate 11 are four circular arcs that are separately arranged and concentric. In the orthographic projections on the touch substrate 11, the first line segment T1 is a section of circular arc that intersects with the first extending portion L1, and the extending portion of the first extending portion L1 is in the normal direction of the intersection-point position in the first line segment T1.

As an example, in FIG. 6A and FIG. 6B, the orthographic projection of the actuator element 12 on the touch substrate 11 is a solid circle, and the boundary of the orthographic projection of the actuator element 12 on the touch substrate 11 is a circle. In the orthographic projections on the touch substrate 11, the first line segment T1 is a section of circular arc that intersects with the first extending portion L1, and the extending portion of the first extending portion L1 is in the normal direction of the intersection-point position in the first line segment T1.

In some embodiments, as shown in any one of FIG. 1A to FIG. 6B, the actuator element 12 includes a single layer of piezoelectric ceramic, or a plurality of layers of piezoelectric ceramic arranged in layer configuration in the normal direction of the touch substrate 11.

As compared with the single layer of piezoelectric ceramic and double layers of piezoelectric ceramic, the plurality of layers of piezoelectric ceramic have the characteristics of low-voltage driving, a more intensive vibration sense and a higher displacement, and are more suitable to realize the effect of tactile feedback in the tactile-feedback modules of a large size and a high mass.

Figure 8:
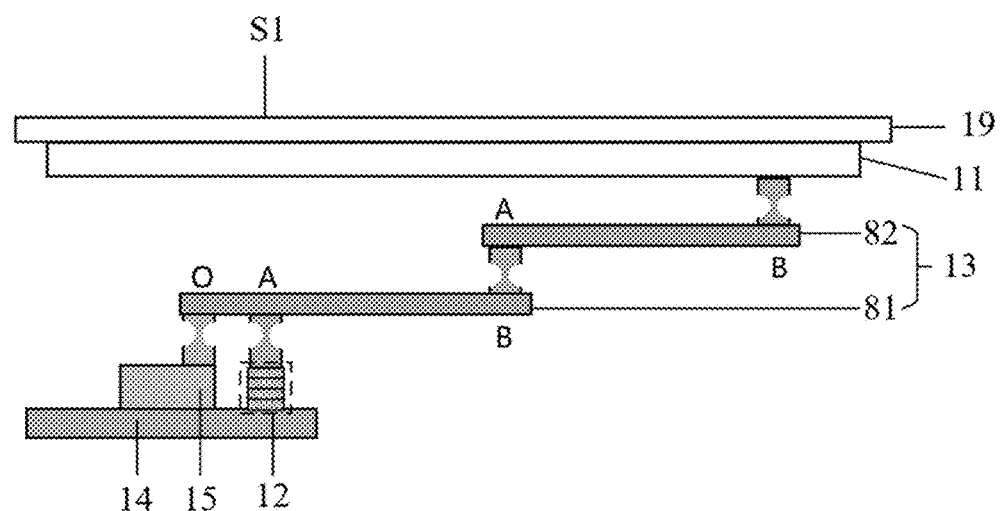
FIG. 8 exemplarily shows a schematic sectional structural diagram of a seventh type of tactile-feedback module.

In some embodiments, as shown in FIG. 8, the lever 13 may include a plurality of sub-levers cascaded to each other, the resistance end B of the preceding one stage of the sub-levers is connected to the power end A of the subsequent one stage of the sub-levers, the power end A of the first-stage sub-lever is connected to the actuator element 12, and the resistance end B of the last-stage sub-lever is connected to the touch substrate 11. Accordingly, by disposing the plurality of sub-levers cascaded to each other, the amplification factor of the displacement of the touch substrate 11 can be further increased, to enhance the effect of the tactile feedback.

As an example, in FIG. 8, the lever 13 may include two sub-levers cascaded to each other, the power end A of the first-stage sub-lever 81 is connected to the actuator element 12, the resistance end B of the first-stage sub-lever 81 is connected to the power end A of the second-stage sub-lever 82, and the resistance end B of the second-stage sub-lever 82 is connected to the touch substrate 11.

In some embodiments, as shown in any one of FIG. 1A to FIG. 6B, the tactile-feedback module may further include a cover plate 19 disposed at the side of the touch substrate 11 closer to the touch surface S1 and configured to protect the touch substrate.

Figure 9:
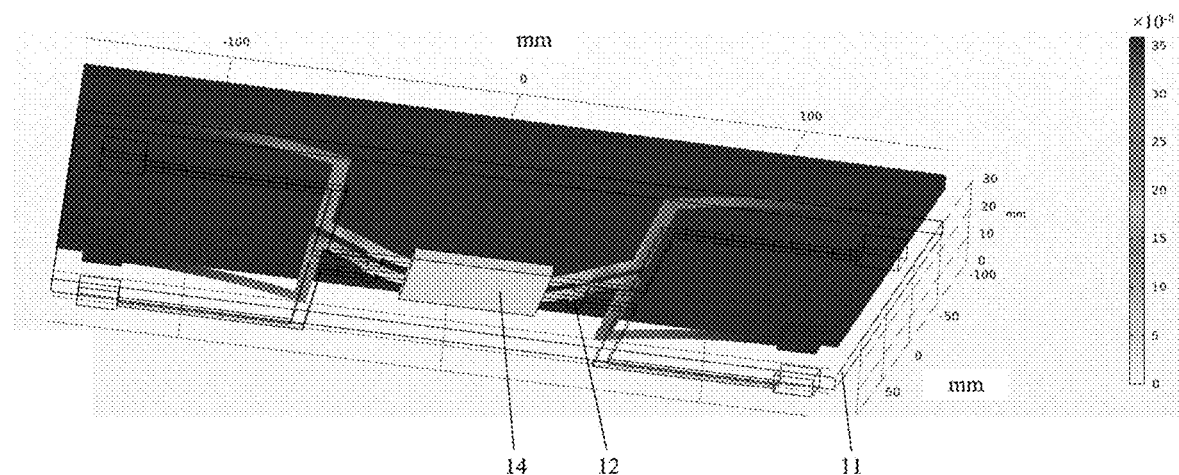
FIG. 9 shows a result of finite element simulation of the third type of tactile-feedback module.

Referring to FIG. 9, FIG. 9 shows a result of finite element simulation of the tactile-feedback module shown in FIG. 3. It can be seen from FIG. 9 that the displacement amount at the actuator element 12 is approximately $5 \times 10^{-8}$ mm, and the displacement amount of the touch substrate 11 is approximately $35 \times 10^{-8}$ mm; in other words, the displacement amount of the touch substrate 11 is approximately 7 times the displacement amount at the actuator element 12. The above result indicates that, by disposing the lever 13, the displacement amount generated by the actuator element 12 can be amplified, to cause the touch substrate to vibrate with the amplified displacement amount, thus the input power or the size of the actuator element 12 can be reduced, the power consumption is reduced, and the tactile feedback of high-mass touch substrates 11 can be realized or the vibrating amplitude of the touch substrate 11 is increased.

An electronic device is provided in the present disclosure, wherein the electronic device includes a display panel, and the tactile-feedback module according to any one of the above embodiments.

A person skilled in the art can understand that the electronic device has the advantages of the tactile-feedback module.

It should be noted that the touch substrate 11 in the tactile-feedback module may be integrated inside the display panel, to form the touch substrate 11 having the function of displaying, and may also be disposed independently of the display panel, for example, adhered to the light exiting side of the display panel, which is not limited in the present disclosure.

In some embodiments, the electronic device may further include:

A driving device connected to the touch substrate 11 and the actuator element 12, and configured to acquire the touch information on the touch substrate 11, and, according to the touch information, emit a driving signal to the actuator element 12, to cause the actuator element 12 to drive the touch substrate 11 to vibrate in the direction parallel to the touch surface S1.

The touch information may contain information such as the touch position. When a finger of the user is touching the touch surface S1 of the touch substrate 11, the touch capacitances at the touch position of the touch driving electrode and the touch sensing electrode in the touch layer may change, the touch wrings in the touch layer can send the touch capacitances at the positions to the driving device, and the driving device, according to the touch capacitances at the positions, can determine the touch position.

As an example, the driving device may, for example, include at least one of an upper computer, an FPGA (Field Programmable Gate Array) and a driving IC (Integrated Circuit) chip, which is not limited in the present embodiment.

In the present disclosure, the meaning of "plurality of" is "two or more", and the meaning of "at least one" is "one or more", unless explicitly and particularly defined otherwise.

In the present disclosure, the terms that indicate orientation or position relations, such as "upper" and "lower", are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure.

In the present text, the terms "include", "contain" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

The "one embodiment", "some embodiments", "exemplary embodiments", "one or more embodiments", "example", "one example" or "some examples" as used herein are intended to indicate that specific features, structures, materials or characteristics related to the embodiment or example are included in at least one embodiment or example of the present disclosure. The illustrative indication of the above terms does not necessarily refer to the same one embodiment or example. Moreover, the specific features, structures, materials or characteristics may be included in any one or more embodiments or examples in any suitable manner.

In the present text, relation terms such as first and second are merely intended to distinguish one entity or operation from another entity or operation, and that does not necessarily require or imply that those entities or operations have therebetween any such actual relation or order.

In the description on some embodiments, "couple" and "connect" may be used. For example, in the description on some embodiments, the term "connect" may be used to indicate that two or more components directly physically contact or electrically contact each other. As another example, in the description on some embodiments, the term "couple" may be used to indicate that two or more components directly physically contact or electrically contact each other. However, the term "couple" or "communicatively couple" may also indicate that two or more components do not directly contact each other, but still cooperate with each other or act on each other. The embodiments disclosed herein are not necessarily limited by the contents herein.

"At least one of A, B and C" and "at least one of A, B or C" have the same meaning, and both of them include the following combinations of A, B and C: solely A, solely B, solely C, the combination of A and B, the combination of A and C, the combination of B and C, and the combination of A, B and C.

"A and/or B" include the following three combinations: solely A, solely B, and the combination of A and B.

As used herein, with reference to the context, the term "if" is optionally interpreted as meaning "when" or "in response to determining that" or "in response to detecting that". Similarly, with reference to the context, the phrase "if it has been determined that" or "if the stated condition or event has been detected" is optionally interpreted as referring to "when it has been determined that" or "in response to determining . . . " or "when the stated condition or event has been detected" or "in response to the stated condition or event having been detected".

The "for" or "configured for" as used herein is intended as opened and inclusive languages, and does not exclude apparatuses adapted for or configured for executing additional tasks or steps.

The "based on" or "according to" as used herein means opening and inclusive. The processes, steps, calculations or other actions based on one or more conditions or values may be based on other conditions or exceed the values in practice. The processes, steps, calculations or other actions according to one or more conditions or values may be according to other conditions or exceed the values in practice.

As used herein, "about", "substantially" or "approximately" includes the described value and the average value within an acceptable deviation range of the particular value, wherein the acceptable deviation range is decided by the discussed measurement that a person skilled in the art has taken into consideration and the error relevant to the measurement on the specific quantity (i.e., the limitation of the measuring system).

As used herein, "parallel", "perpendicular", "equal" and "flushing" include the described case and cases similar to the described case, wherein the range of the similar cases is within an acceptable deviation range, wherein the acceptable deviation range is decided by the discussed measurement that a person skilled in the art has taken into consideration and the error relevant to the measurement on the specific quantity (i.e., the limitation of the measuring system). For example, "parallel" includes absolute parallelism and approximate parallelism, wherein the acceptable deviation range of the approximate parallelism may, for example, be deviations within 5°. "Perpendicular" includes absolute perpendicularity and approximate perpendicularity, wherein the acceptable deviation range of the approximate perpendicularity may also, for example, be deviations within 5°. "Equal" includes absolute equality and approximate equality, wherein the acceptable deviation range of the approximate equality may, for example, be that the difference between the two equal instances is less than or equal to 5% of any one of them. "Flushing" includes absolute flushing and approximate flushing, wherein the acceptable deviation range of the approximate flushing may, for example, be that the distance between the two flushing instances is less than or equal to 5% of the dimension of any one of them.

It should be understood that, when a layer or element is described as on another layer or a base board, the layer or element may be directly on the another layer or the base board, or an intermediate layer may also exist between the layer or element and the another layer or the base board.

The exemplary embodiments are described herein with reference to sectional views and/or plan views as idealized illustrative figures. In the drawings, in order for clarity, the thicknesses of the layers and the regions are exaggerated. Therefore, alterations from the shapes of the figures as the result of, for example, fabricating techniques and/or tolerances can be envisaged. Therefore, the exemplary embodiments should not be interpreted as limited to the shapes of the regions shown herein, but should include the shape deviations caused by, for example, fabrication. For example, an etching region illustrated as rectangular generally has a curved feature. Therefore, the regions shown in the drawings are essentially illustrative, and their shapes are not intended to illustrate the practical shapes of the regions of the device, and are not intended to limit the scopes of the exemplary embodiments.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A tactile-feedback module, comprising:
   a touch substrate having a touch surface;
   an actuator element disposed at one side of the touch substrate away from the touch surface and configured to generate vibration in a first direction, wherein the first direction intersects with the touch surface;
   a lever located between the actuator element and the touch substrate, wherein a power end of the lever is connected to the actuator element, a resistance end of the lever is connected to the touch substrate, in a stationary state of the actuator element, a plane where the lever is located is parallel to the touch surface, and the lever is configured to, under driving of the actuator element, drive the touch substrate to vibrate;
   a supporting base located at one side of the actuator element away from the touch substrate; and
   an anchoring-point portion located between the supporting base and the lever, and fixed on the supporting base,
   wherein a fulcrum of the lever is disposed at one side of the anchoring-point portion away from the supporting base, the actuator element is fixed on the supporting base, and the actuator element and the anchoring-point portion are separate from each other, and
   wherein the power end is located between the fulcrum and the resistance end, and an orthographic projection of the anchoring-point portion on the touch substrate is closer to a geometric center of the touch surface.

2. The tactile-feedback module according to claim 1, wherein the tactile-feedback module comprises a plurality of instances of the lever, the fulcrums of the plurality of levers are disposed on a same anchoring-point portion, and the orthographic projection of the anchoring-point portion on the touch substrate covers the geometric center.

3. The tactile-feedback module according to claim 1, wherein the tactile-feedback module comprises a plurality of instances of the lever, the plurality of levers are connected to a same actuator element, and the actuator element is of a first closed-loop structure surrounding the anchoring-point portion by one circle.

4. The tactile-feedback module according to claim 3, wherein the plurality of levers comprise a first lever group and a second lever group, and in a second direction, the power ends of the levers in the first lever group and the power ends of the levers in the second lever group are centrally arranged on the first closed-loop structure, wherein the second direction is perpendicular to a direction of a connecting line between the first lever group and the second lever group.

5. The tactile-feedback module according to claim 1, wherein the tactile-feedback module comprises a plurality of instances of the actuator element and a plurality of instances of the lever, the plurality of levers comprise a third lever group and a fourth lever group, the levers in the third lever group are connected to a same actuator element, the levers in the fourth lever group are connected to a same actuator element, and the levers in the third lever group and the levers in the fourth lever group are connected to different actuator elements.

6. A tactile-feedback module, comprising:
   a touch substrate having a touch surface;
   an actuator element disposed at one side of the touch substrate away from the touch surface and configured to generate vibration in a first direction, wherein the first direction intersects with the touch surface;
   a lever located between the actuator element and the touch substrate, wherein a power end of the lever is connected to the actuator element, a resistance end of the lever is connected to the touch substrate, in a stationary state of the actuator element, a plane where the lever is located is parallel to the touch surface, and the lever is configured to, under driving of the actuator element, drive the touch substrate to vibrate;
   a supporting base located at one side of the actuator element away from the touch substrate; and
   an anchoring-point portion located between the supporting base and the lever, and fixed on the supporting base,
   wherein a fulcrum of the lever is disposed at one side of the anchoring-point portion away from the supporting base, the actuator element is fixed on the supporting base, and the actuator element and the anchoring-point portion are separate from each other, and
   wherein the fulcrum is located between the power end and the resistance end, and an orthographic projection of the actuator element on the touch substrate is closer to a geometric center of the touch surface.

7. The tactile-feedback module according to claim 6, wherein the tactile-feedback module comprises a plurality of instances of the lever, the plurality of levers are connected to a same actuator element, and the orthographic projection of the actuator element on the touch substrate covers the geometric center.

8. The tactile-feedback module according to claim 6, wherein the tactile-feedback module comprises a plurality of instances of the lever, the fulcrums of the plurality of levers are disposed on a same anchoring-point portion, and the anchoring-point portion is of a second closed-loop structure surrounding the actuator element by one circle.

9. The tactile-feedback module according to claim 6, wherein the tactile-feedback module comprises at least two instances of the lever, and the at least two levers share one power end, and are connected to each other at a position of the power end to form an integral structure.

10. The tactile-feedback module according to claim 6, wherein a distance between the fulcrum and the power end is less than a distance between the fulcrum and the resistance end.

11. The tactile-feedback module according to claim 1, wherein the tactile-feedback module further comprises a plurality of hinges, each of the hinges comprises two connecting faces that are opposite to each other, and the plurality of hinges comprise at least one of:
- a first hinge, wherein one of the two connecting faces is connected to the power end, and the other of the two connecting faces is connected to the actuator element;
- a second hinge, wherein one of the two connecting faces is connected to the touch substrate, and the other of the two connecting faces is connected to the resistance end; and
- a third hinge, wherein one of the two connecting faces is connected to the fulcrum of the lever, and the other of the two connecting faces is connected to the anchoring-point portion.

12. The tactile-feedback module according to claim 11, wherein each of the hinges comprises a side face, the side face is connected between the two connecting faces, and the side face has a groove that is recessed towards an interior of the hinge.

13. The tactile-feedback module according to claim 12, wherein in a longitudinal cross section of the hinge, a shape of the groove comprises at least one of a semicircular shape, a semi-elliptical shape, a polygon and an irregular pattern, wherein the longitudinal cross section is a cross section perpendicular to each of the two connecting faces.

14. The tactile-feedback module according to claim 12, wherein the groove is of a closed structure or unclosed structure surrounding the hinge by one circle.

15. The tactile-feedback module according to claim 12, wherein in a direction parallel to the touch surface, a ratio of a minimum width of the hinges to a maximum width of the hinges is greater than or equal to 0.1, and less than or equal to 0.9.

16. The tactile-feedback module according to claim 11, wherein an elasticity modulus of each of the hinges is greater than or equal to 10 GPa, and less than or equal to 300 GPa.

17. The tactile-feedback module according to claim 11, wherein connections of the hinges to the lever, the actuator element, the touch substrate and/or the anchoring-point portion are rigid connections.

18. An electronic device, wherein the electronic device comprises a display panel, and the tactile-feedback module according to claim 1.

* * * * *